(12) United States Patent  
Osaku et al.

(10) Patent No.: US 7,544,328 B2  
(45) Date of Patent: *Jun. 9, 2009

(54) STRUCTURE FOR REDUCING AGENT CONTAINER

(75) Inventors: Yasushi Osaku, Ageo (JP); Toshio Kondou, Ageo (JP); Kiyoshi Fukuda, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 160 days.

This patent is subject to a terminal disclaimer.

(21) Appl. No.: 11/528,597

(22) Filed: Sep. 28, 2006

(65) Prior Publication Data

US 2007/0075467 A1    Apr. 5, 2007

Related U.S. Application Data

(63) Continuation of application No. PCT/JP2005/003934, filed on Mar. 8, 2005.

(30) Foreign Application Priority Data

Mar. 29, 2004   (JP)   ............................. 2004-094375  
Apr. 27, 2004   (JP)   ............................. 2004-131795  
Oct. 19, 2004   (JP)   ............................. 2004-303615

(51) Int. Cl.  
B01J 8/00    (2006.01)

(52) U.S. Cl. .................... 422/102; 422/63; 422/99; 423/239.1; 423/212; 423/235; 73/1.73; 73/447; 73/747

(58) Field of Classification Search .............. 423/239.1, 423/212, 235; 137/88, 297; 75/259, 361, 75/443, 463, 548, 608; 422/102, 63, 99; 73/1.73, 447, 747  
See application file for complete search history.

(56) References Cited

U.S. PATENT DOCUMENTS

| | | | | | |
|---|---|---|---|---|---|
| 2,534,907 | A | * | 12/1950 | Ham et al. ................... | 204/559 |
| 3,552,364 | A | * | 1/1971 | Short et al. ................. | 123/25 P |
| 3,911,971 | A | * | 10/1975 | Smithson et al. ............... | 141/1 |
| 5,431,894 | A | * | 7/1995 | Onishi et al. ............. | 423/239.1 |
| 6,063,350 | A | * | 5/2000 | Tarabulski et al. ....... | 423/239.1 |
| 2004/0045284 | A1 | | 3/2004 | Ripper et al. | |

FOREIGN PATENT DOCUMENTS

DE            101 56 714 B4        6/2002

(Continued)

*Primary Examiner*—Jill Warden  
*Assistant Examiner*—Dwan A Gerido  
(74) *Attorney, Agent, or Firm*—Baker & Hostetler LLP (57) ABSTRACT

A canopy is removably secured to the container body, is respectively fitted with: a base of a water level indicator for detecting a remaining amount of liquid reducing agent; a base of a densitometer for detecting a concentration of a liquid reducing agent; and a heat exchanger which surrounds detection portions respectively suspended from the bases of the water level indicator and the densitometer, and through which is circulated engine coolant, to perform heat exchange with the liquid reducing agent, and a supply port and a return port for the liquid reducing agent are respectively formed in the canopy. The water level indicator, the densitometer, the heat exchanger, and the supply port and the return port for the liquid reducing agent are formed integrally with the canopy, so that the water level indicator and the densitometer can be dismounted together with the canopy at the same time.

2 Claims, 6 Drawing Sheets

FOREIGN PATENT DOCUMENTS

| | | |
|---|---|---|
| JP | 5-222923 A | 8/1993 |
| JP | 8-57261 A | 3/1996 |
| JP | 2000-27627 A | 1/2000 |
| JP | 2002-155732 A | 5/2002 |
| JP | 2002-527660 A | 8/2002 |
| JP | 2004-257325 A | 9/2004 |
| JP | 2004-538424 A | 12/2004 |
| WO | WO 00/21881 A1 | 4/2000 |
| WO | WO 03/018177 A1 | 3/2003 |

* cited by examiner

STRUCTURE FOR REDUCING AGENT CONTAINER

This application is a continuation of PCT/JP2005/003934, filed on Mar. 8, 2005.

BACKGROUND OF THE INVENTION

1. Field of the Invention

The present invention relates to a structure for a reducing agent container which stores a liquid reducing agent used in an exhaust gas purification apparatus which reduces and purifies nitrogen oxide (NOx) in exhaust gas. In particular, the invention relates to technology which simplifies inspection and maintenance of a densitometer and a water level indicator which respectively detect the concentration and remaining amount of liquid reducing agent.

2. Description of the Related Art

As a catalytic conversion system for removing NOx contained in engine exhaust gas, there is proposed an exhaust gas purification apparatus disclosed in Japanese Unexamined Patent Publication No. 2000-27627. This exhaust gas purification apparatus injection supplies liquid reducing agent in a necessary amount corresponding to engine operating conditions, into the exhaust gas upstream of a reduction catalyst which is arranged in the engine exhaust pipe, to thereby subject the NOx and the liquid reducing agent in the exhaust gas to a catalytic reduction reaction, and thus purification process the NOx into harmless constituents. Here, in the reduction reaction, ammonia which has good reactiveness with NOx is used, and for the liquid reducing agent, a urea aqueous solution which is hydrolyzed by the heat and the water vapor in the exhaust gas and produces ammonia, is used.

However, in the reducing agent container which stores the liquid reduction agent, in order to be able to demonstrate the function as an exhaust gas purification apparatus, at least a densitometer and a water level indicator for respectively detecting the concentration and the remaining amount of the liquid reducing agent, as well as a heat exchanger through which the engine coolant is circulated to prevent freezing of the liquid reducing agent under a low temperature condition such as during winter season and so on, must be respectively fitted, and also it is necessary to respectively form a supply port and a return port for the liquid reducing agent. At this stage, regarding the densitometer and the water level indicator, since periodic inspection and maintenance is necessary, there is a requirement to detachably fit these to the reducing agent container.

However, even if the densitometer and the water level indicator are detachably fitted to the reducing agent container, if their attachment and detachment requires a lot of time and labor, inspection and maintenance takes time, so that the cost for maintaining the function of the exhaust gas purification apparatus is likely to rise. Furthermore, if the interval of inspection and maintenance is lengthened in order to avoid an increase in cost required for inspection and maintenance, there is the likelihood of the engine being operated with insufficient function of the exhaust gas purification apparatus.

SUMMARY OF THE INVENTION

Therefore, taking into consideration the above problems up to now, an object of the present invention is to provide a structure for a reducing agent container in which the labor necessary for inspection and maintenance may be reduced by enabling simple removal and attachment of the densitometer and the water level indicator from the reducing agent container.

Therefore, in accordance with the present invention, a structure of a reducing agent container is provided with such a configuration that a canopy for blocking off an opening arranged in an upper face of a container body, and which is removably secured to the container body, is respectively fitted with: a base of a water level indicator for detecting a remaining amount of liquid reducing agent; a base of a densitometer for detecting a concentration of a liquid reducing agent; and a heat exchanger which surrounds detection portions suspended from the bases of the water level indicator and the densitometer, and through which is circulated a heating medium of which a heat source is comprised of an engine, to perform heat exchange with the liquid reducing agent, and a supply port and a return port for the liquid reducing agent are respectively formed in the canopy, and the water level indicator, the densitometer, the heat exchanger, and the supply port and the return port for the liquid reducing agent are formed integrally with the canopy.

Preferably, the canopy is comprised of a metal plate with good heat transfer characteristics. Thus, heat is easily transferred from the inlet port of the heating medium to the canopy, so that the canopy can be warmed up in a short time and evenly, and the surroundings of the supply port and the return port of the liquid reducing agent are heated. Therefore, freezing of the liquid reducing agent existing around the supply port and the return port of the liquid reducing agent can be prevented.

According to the structure for a reducing agent container in accordance with the present invention, when the water level indicator and the densitometer fitted to the reducing agent container are to be inspected and maintained, the canopy which closes the opening provided in the upper surface of the container body is dismounted from the container body, and the heat exchanger is drawn out upwards without causing any interference of the heat exchanger with the container body. At this time, since in addition to the heat exchanger, the bases of the water level indicator and the densitometer are respectively attached to the canopy, these can also be dismounted at the same time. Then, once the inspection and maintenance of the water level indicator and the densitometer has been completed, the heat exchanger is inserted from the opening provided in the upper surface of the container body, and the canopy is secured to the upper surface of the container body. Consequently, since the water level indicator, the densitometer, the heat exchanger, and the supply port and return port of the liquid reducing agent which are integrated with the canopy, are not fixed to the inside wall of the container body, then at the time of inspection and maintenance of the water level indicator and the densitometer, it is not necessary to disassemble the reducing agent container, and hence the man hours can be considerably reduced.

DESCRIPTION OF THE PREFERRED EMBODIMENTS

Hereunder is a detailed description of the present invention with reference to the accompanying drawings.

Figure 1:
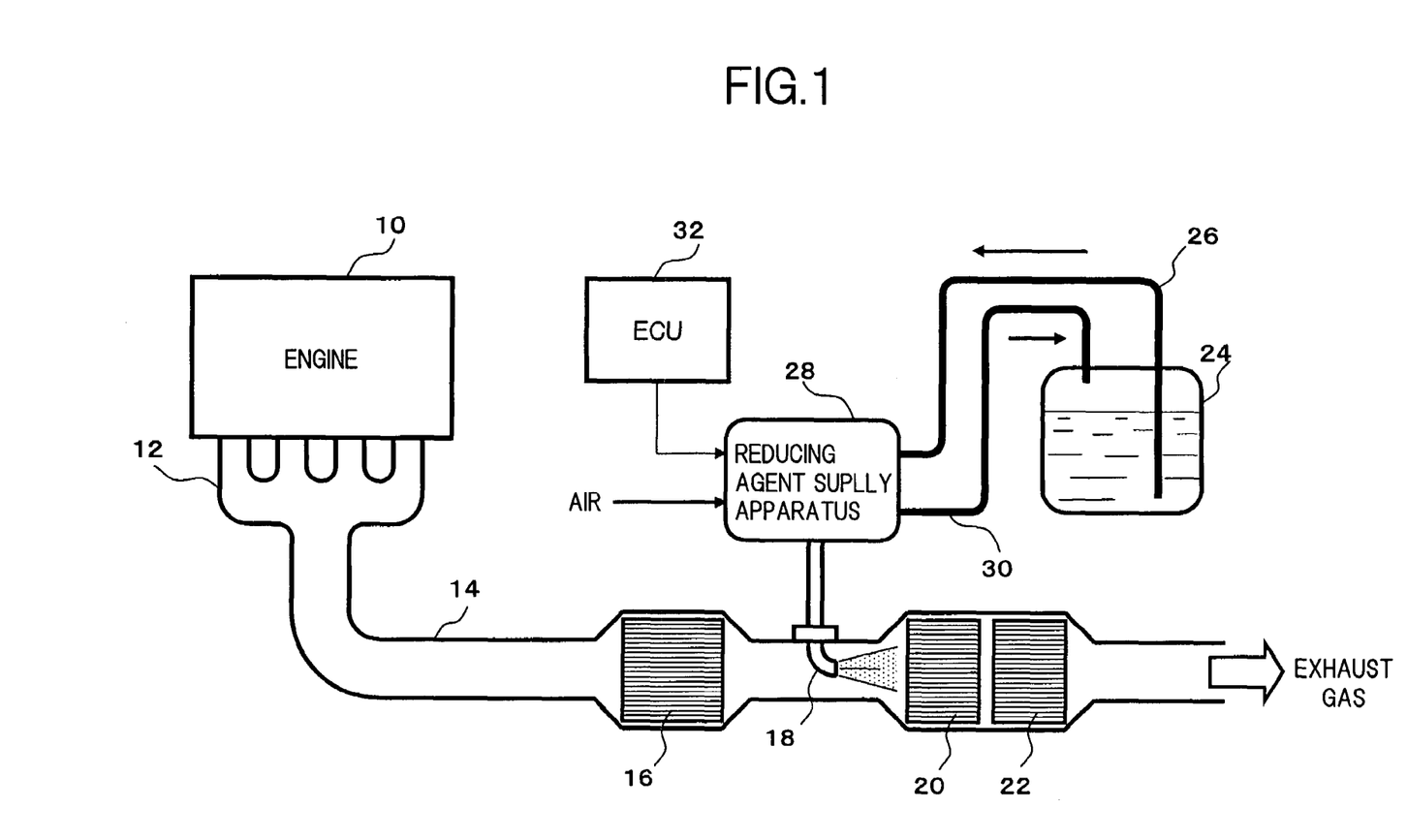
FIG. 1 is an overall block diagram of an exhaust gas purification apparatus within the scope of the present invention.

FIG. 1 is an overall block diagram of an exhaust gas purification apparatus which uses a urea aqueous solution as a liquid reducing agent, and which purifies the NOx contained in engine exhaust gas by a reduction catalyst reaction.

An exhaust pipe 14 connected to an exhaust gas manifold 12 of an engine 10 is respectively provided along the direction of the exhaust gas flow with: an oxidation catalytic converter 16 which oxidizes nitrogen monoxide (NO) to nitrogen dioxide ($NO_2$); an injection nozzle 18 which injects a urea aqueous solution; a NOx reduction catalytic converter 20 which reduction purifies NO by ammonia obtained by hydrolysis of the urea aqueous solution; and an ammonia oxidation catalytic converter 22 which oxidizes the ammonia which has passed through the NOx reduction catalytic converter 20. Furthermore, the urea aqueous solution stored in a reducing agent container 24 is supplied via a supply pipe 26 with an inlet port positioned on the bottom thereof, to a reducing agent supply apparatus 28, and surplus urea aqueous solution that does not contribute to injection by the reducing agent supply apparatus 28 is returned to the upper internal space of the reducing agent container 24 via a return pipe 30. Still further, the reducing agent supply apparatus 28 is controlled by a control unit 32 with a built in computer, and urea aqueous solution in a necessary amount corresponding to the engine operating conditions is supplied to the injection nozzle 18 while being mixed with air.

In such an exhaust gas purification apparatus, the urea aqueous solution which is injection supplied from the injection nozzle 18 is hydrolyzed by the exhaust heat and the water vapor in the exhaust gas, to generate ammonia. It is known that the generated ammonia reacts with the NOx in the exhaust gas in the NOx reduction catalytic converter 20, and is purified to water and harmless gas. At this time, in order to improve the NOx purification efficiency by the NOx reduction catalytic converter 20, the NO is oxidized to $NO_2$ by the oxidation catalytic converter 16, so that the proportion of NO and $NO_2$ in the exhaust gas is improved to be appropriate for a catalytic reduction reaction. Further, the ammonia which has passed through the NOx reduction catalytic converter 20 is oxidized by the ammonia oxidation catalytic converter 22 arranged on the exhaust gas downstream side of the NOx reduction catalytic converter 20. Therefore, direct discharge to the atmosphere of ammonia which gives off an unpleasant smell can be prevented.

Figure 2:
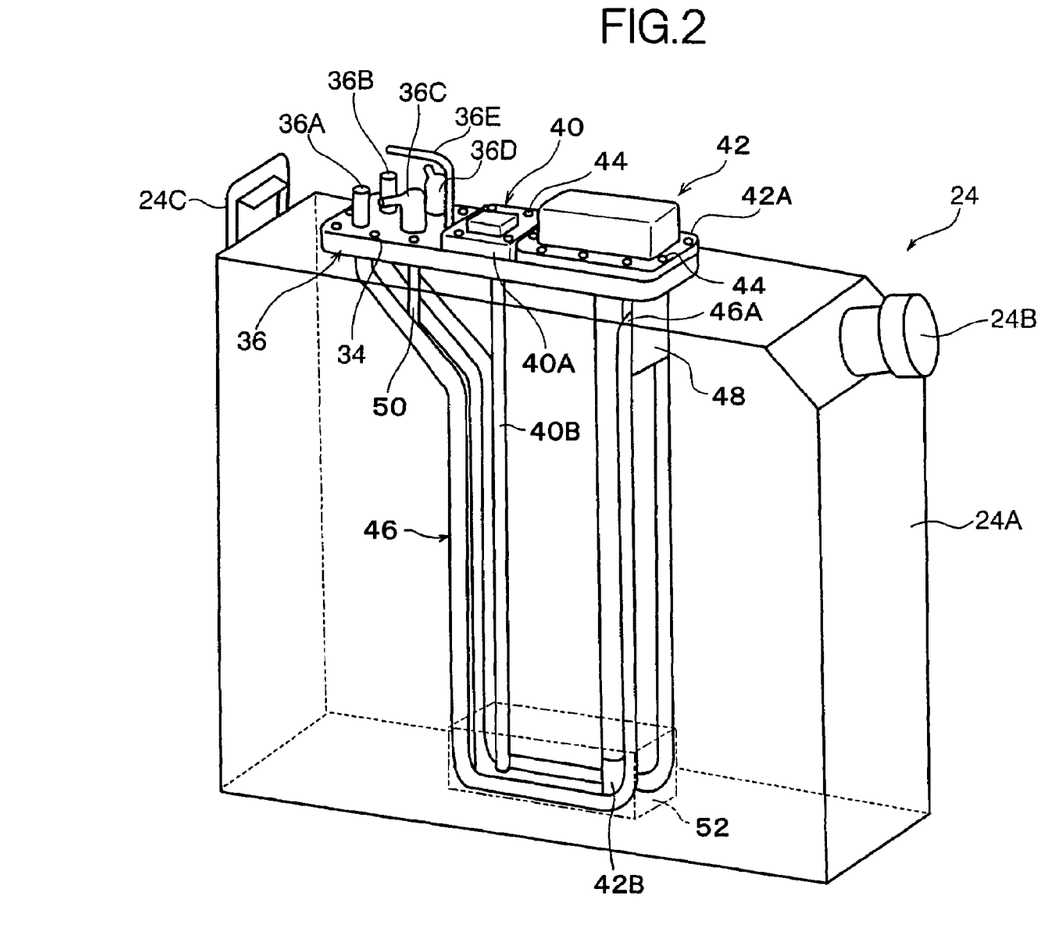
FIG. 2 is a perspective view showing a reducing agent container and an inside configuration thereof.

The reducing agent container 24, as shown in FIG. 2 is one where on the upper portion of side faces which form the two side walls in the longitudinal direction of a container body 24A which is an approximate rectangular parallelepiped shape, is respectively formed a replenishment port 24B for replenishing the urea aqueous solution, and a handle 24C for holding when transporting. Furthermore, on the upper face of the container body 24A, is provided an opening (not shown in the figure), and in order to close this, a canopy 36 is removably fastened or secured by means of a plurality of bolts 34 serving as fastening or securing members. Here, the canopy 36 is preferably made from a metal plate which has good heat transfer characteristics.

Figure 3:
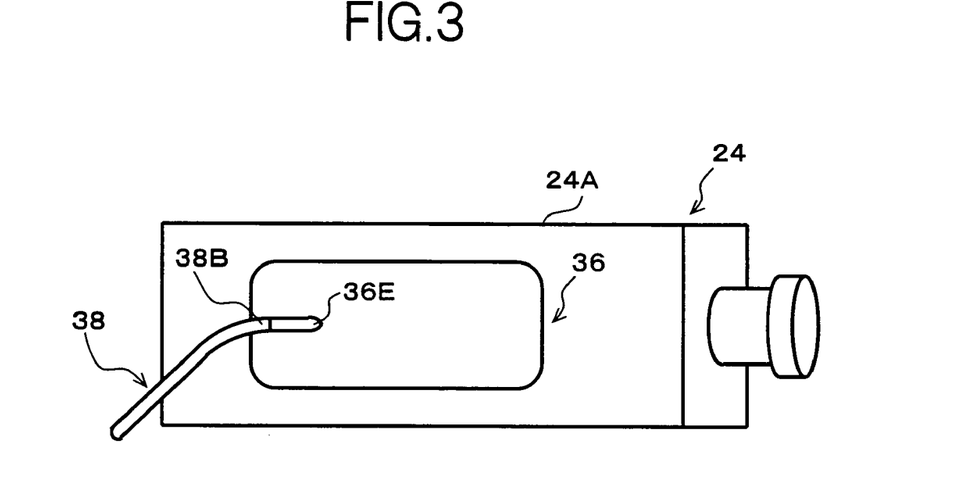
FIG. 3 is a plan view showing a connection condition of a breather hose.
Figure 4:
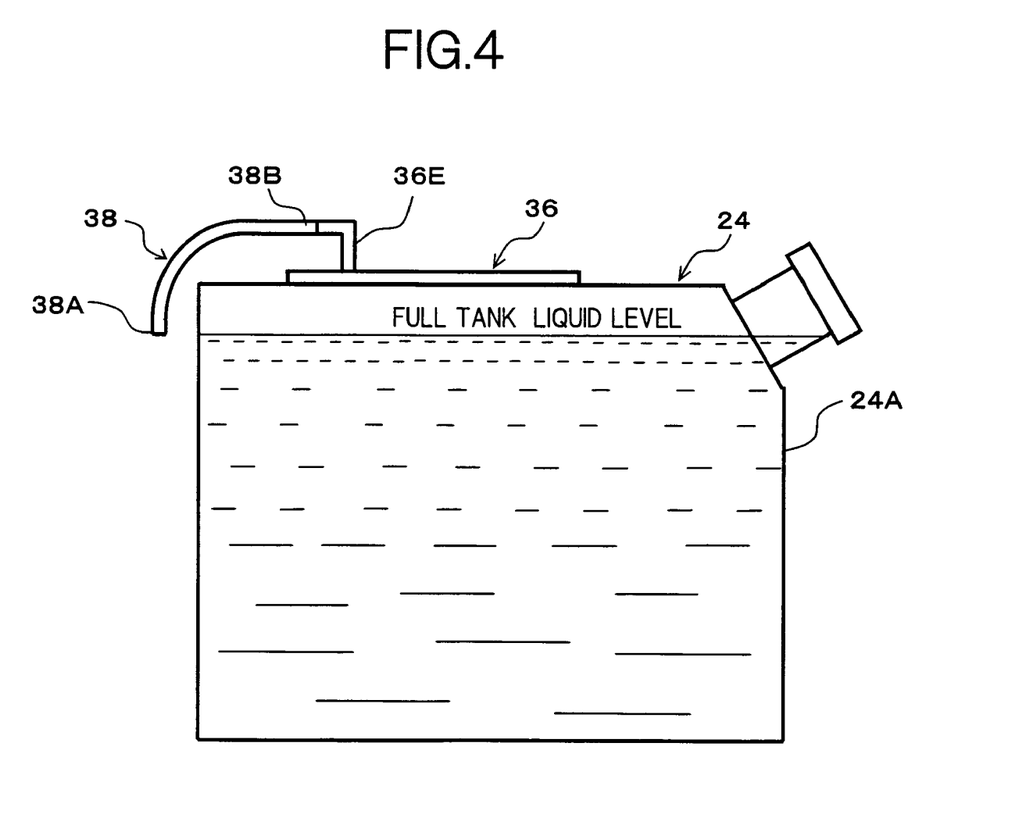
FIG. 4 is a front view showing a connection condition of the breather hose.

On the upper face of the canopy 36 is respectively formed from one longitudinal direction edge portion thereof towards the center portion; an inlet 36A and an outlet 36B for the engine coolant serving as a heating medium with the engine as the heat source, a supply port 36C and a return port 36D for the urea aqueous solution, and an aperture 36E for opening the upper space of the interior to the atmosphere. Here, the aperture 36E is formed as a tube having a part which extends upward, and as shown in FIG. 3 and FIG. 4, is connected to a base end 38B of a breather hose 38 which is arranged in a condition with a tip end 38A in the vicinity of a full tank liquid level facing approximately straight down. Moreover, on the canopy 36, towards the other end portion from the center in the lengthwise direction, a base 40A of a water level indicator 40 which detects a remaining amount of urea aqueous solution, and a base 42A of a densitometer 42 which detects the density of the urea aqueous solution, are respectively secured so as to be removable by means of bolts 44 serving as fastening members. The water level indicator 40 is one with a cylindrical cross-section inside electrode and outside electrode arranged concentrically, and which detects the water level of the urea aqueous solution from a change in capacitance between the electrodes. A detecting portion 40B comprised of the inside electrode and the outside electrode is suspended towards the bottom of the container body 24A from the base 40A. On the other hand, the densitometer 42 detects the concentration of the urea aqueous solution from the heat transfer characteristics between two separated points, and a detecting portion 42B is suspended from the base 42A so that the detecting portion 42B is positioned at the bottom of the container body 24A.

The inlet 36A and the outlet 36B for the engine coolant are mutually connected by a heat exchanger 46 which is installed inside the container body 24A. The heat exchanger 46 is one where an approximate U-shape pipe is bent so as to surround the water level indicator 40 and the densitometer 42 in the bottom portion of the container body 24A, and a tip end bent portion 46A thereof is supported by a metal bracket 48 which is fixed to the canopy 36. If the heat exchanger 46 is constructed in this manner with the U-shape pipe formed bent, then the total length of the heat exchanger 46 inside the reducing agent container becomes long, so that heat exchange can be efficiently performed with the liquid reducing agent. Furthermore, to the supply port 36C of the urea aqueous solution is connected a suction pipe 50 which sucks in urea aqueous solution from the bottom portion of the container body 24A. The suction pipe 50 is arranged so as to extend along the pipe member of which one end is connected to the inlet 36A for the engine coolant, in order to surely exchange heat with the heat exchanger 46.

Furthermore, on the bottom portion of the heat exchanger 46, so as to protect the water level indicator 40 and the densitometer 42 from chunks of ice of the urea aqueous solution which freezes inside the reducing agent container 24, there is fixed a protector 52 of an approximate box shape with only the upper face open. If this is done, then even if chunks of ice of the urea aqueous solution move about or tumble inside the reducing agent container 24, for example this does not collide with the detecting portion 42B of the densitometer 42, so that the occurrence of failure due to damage can be prevented beforehand.

When the water level indicator 40 and the densitometer 42 fitted to the reducing agent container 24 are to be inspected and maintained, the bolts 34 which fasten the canopy 36 to the container body 24A are dismounted, and the heat exchanger 46 is drawn out upwards so as not to interfere with the reducing agent container 24. At this time, since the water level indicator 40 and the densitometer 42 and the like are formed integral in addition to the heat exchanger 46, on the canopy 36, then these can also be dismounted at the same time. Then, once the inspection and maintenance of the water level indicator 40 and the densitometer 42 has been completed, the heat exchanger 46 is inserted from the opening arranged in the upper face of the container body 24A, and the canopy 36 is secured to the upper face by means of the bolts 34. When carrying out this inspection and maintenance, since the canopy 36, and the water level indicator 40 and the densitometer 42 which are formed integral therewith are not fixed to the inner wall of the reducing agent container 24, it is not necessary to disassemble the reducing agent container 24, and hence the man hours can be considerably reduced.

On the other hand, since the tip end bent portion 46A of the pipe constituting the heat exchanger 46 is supported by the bracket 48 fixed to the canopy 36, the heat exchanger 46 is supported and fixed at three points with respect to the canopy 36, so that the mounting rigidity can be increased. Furthermore, the heat from the heat exchanger 46 is transmitted to the canopy 36 via the bracket 48 from the tip end bent portion 46A. Therefore, in addition to the heat transmitting from the inlet 36A for the engine coolant, the canopy 36 is warmed up by the heat transmitted via the metal bracket 48, so that the surroundings of the supply port 36C and the return port 36D of the urea aqueous solution are heated. Consequently, even if the pipings connected to these are exposed to the outside air, freezing of the urea aqueous solution thereinside can be efficiently prevented.

Furthermore, since the base end 38B of the breather hose 38 which is arranged with the tip end 38A in a condition facing approximately straight down, is connected to the aperture 36E formed in the canopy 36, the upper space inside the reducing agent container 24 is exposed to the atmosphere via the aperture 36E and the breather hose 38. Therefore, even if the gas existing in the upper space of the reducing agent container 24 is expanded due for example to an increase in the atmospheric temperature, this is discharged to the atmosphere, and hence an increase in pressure inside the container can be suppressed. Here, the gas in the upper space contains a small amount of ammonia generated by the temperature rise of the urea aqueous solution. However, since the aperture 36E has a part which extends upwards, and the tip end 38A of the breather hose 38 faces approximately straight down, then ammonia with a specific gravity less than air accumulates in the vertical top portion of the breather hose 38, and discharge to the atmosphere is suppressed. Furthermore, since the aperture 36E is formed integral with the canopy 36, then even if urea is precipitated in the opening, this can be easily removed when carrying out inspection and maintenance of the water level indicator 40 and the densitometer 42.

When the reducing agent container 24 is mounted on a moving vehicle, preferably the aperture 36E is formed at a position corresponding to the approximate center of a horizontal cross-sectional plane of the container body 24A. That is, when a moving vehicle is running, acceleration acts in multi-directions on the reducing agent container 24, and hence the urea aqueous solution is shook while sloshing about the approximate center of the container body 24A. If the aperture 36E is formed at a position corresponding to the approximate center of the horizontal cross-sectional plane of the container body 24A, then even if the urea aqueous solution sloshes, this is unlikely to reach to the opening of the aperture 36E, and direct discharge of the urea aqueous solution via the breather hose 38 can be prevented.

Incidentally, in the water level indicator 40, due to the detection principle thereof, it is necessary to maintain the minute space between the inside electrode and the outside electrode approximately constant. However, since the water level indicator 40 is secured to the canopy 36 in a cantilever condition, the tip end portion thereof can easily swing due to vibration and the like, and hence the minute gap between the inside electrode and the outside electrode becomes unstable. Hence it may not be possible to accurately detect the water level of the urea aqueous solution.

Therefore, it is preferable to adopt the following tip end support structure of the water level indicator 40. That is, at a position where the heat exchanger 46 extends parallel along the bottom face of the container body 24A spaced apart with a predetermined gap, at a position corresponding to the detecting portion 40B of the water level indicator 40, a bracket 54 of an approximate hat shape in cross-section is secured as shown in detail in FIG. 5 through FIG. 7. On the other hand, on the tip end portion of the detecting portion 40B of the water level indicator 40, is press-fitted a cap 56 formed with a pin 56A of a taper shape with diameter reducing towards the tip end. Furthermore, a tip end portion of the water level indicator 40 is supported by insertion of the pin 56A of the cap 56 into an insertion hole 54A arranged in the upper face of the bracket 54.

Figure 5:
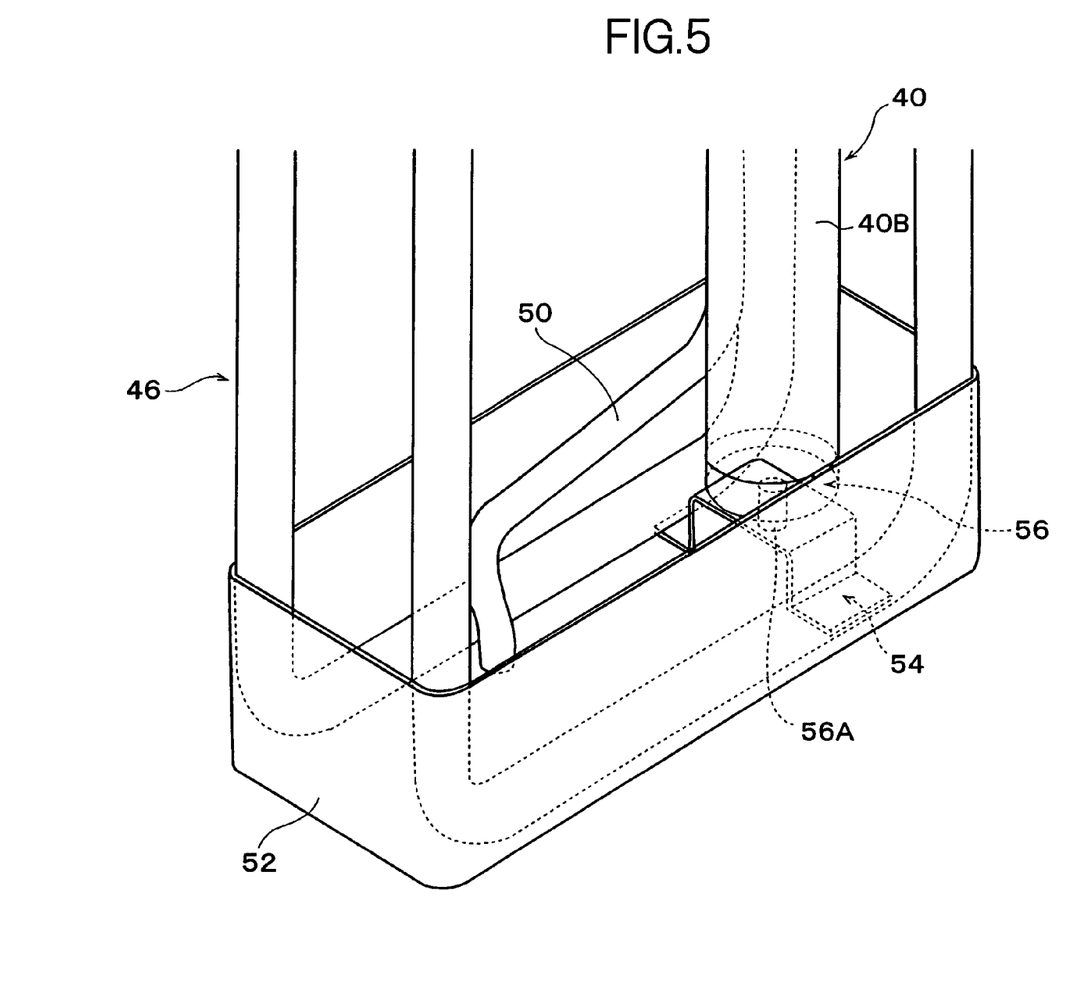
FIG. 5 is a perspective view showing a tip support structure for a water level indicator.
Figure 6:
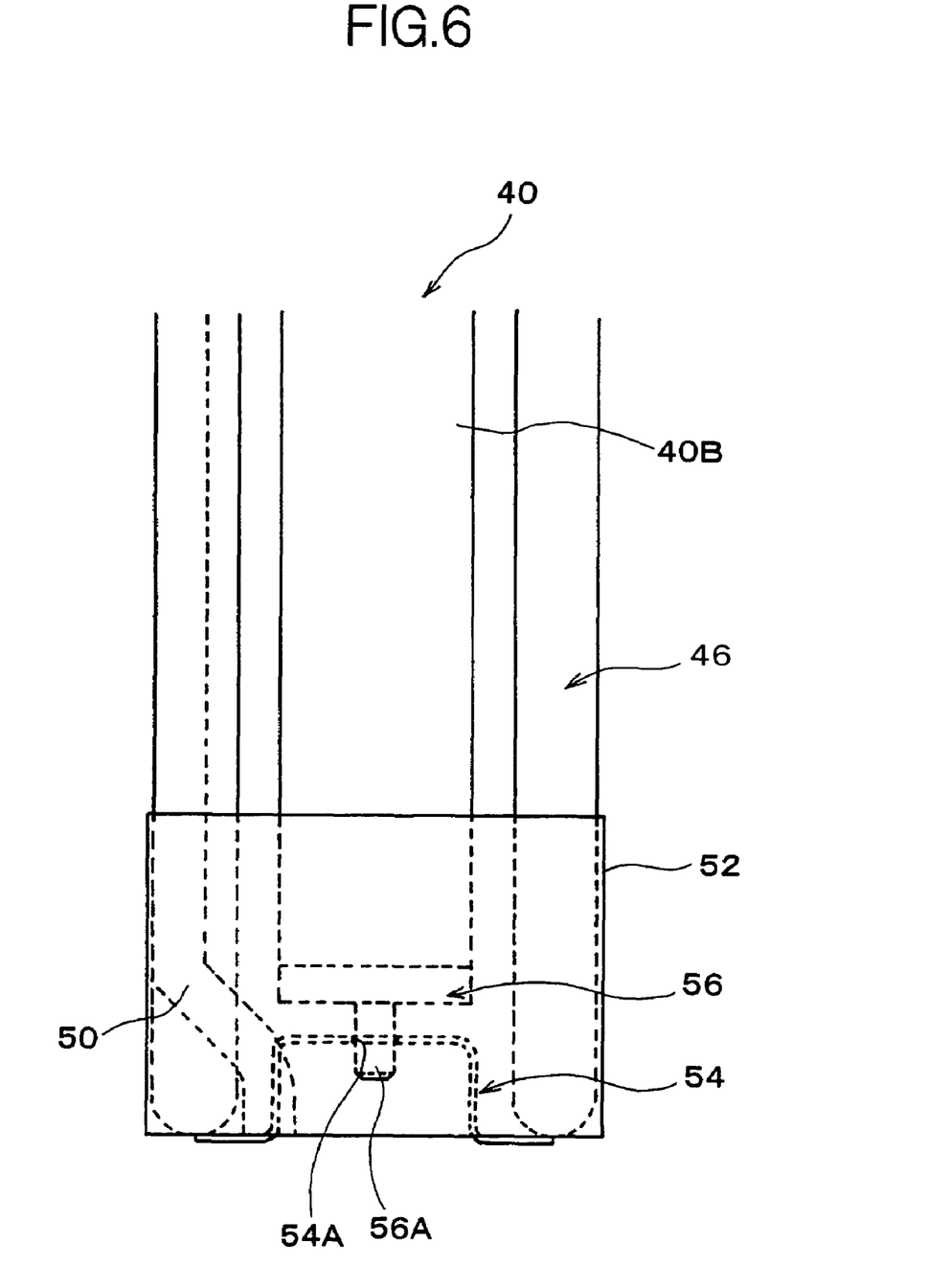
FIG. 6 is a side view showing the tip support structure for the water level indicator.
Figure 7:
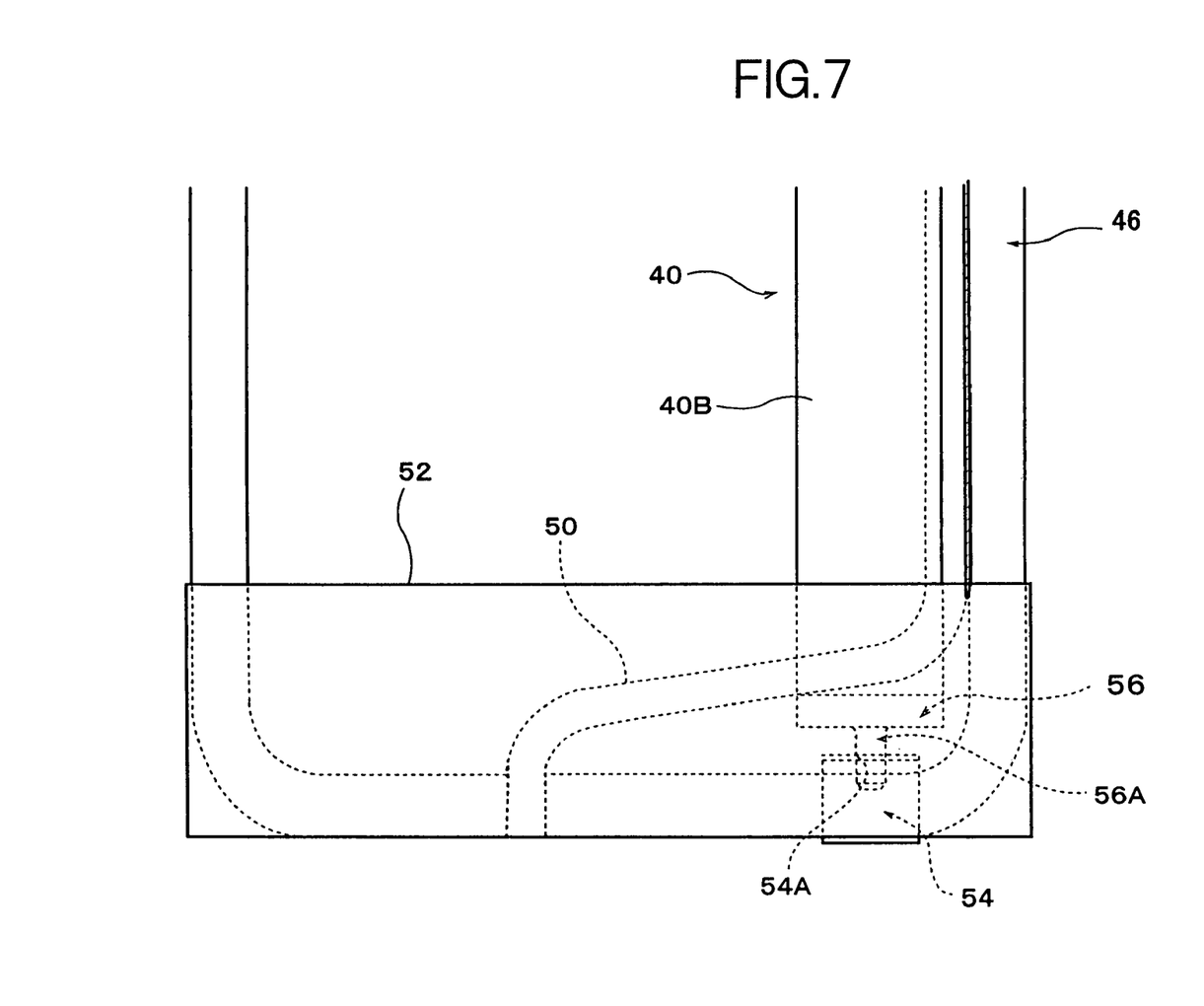
FIG. 7 is a front view showing the tip support structure for the water level indicator.

If this is done, the tip end portion of the water level indicator 40 is supported by the bracket 54 fixed to the heat exchanger 46, and hence the minute gap between the inside electrode and the outside electrode can be held approximately constant without being easily swung due to vibration and the like. Therefore, the water level of the urea aqueous solution can be accurately detected. Furthermore, since the bracket 54 which supports the tip end portion of the water level indicator 40 is fitted at a position where the heat exchanger 46 extends parallel along the bottom face of the container body 24A spaced apart with a predetermined gap, the central portion of the pipe constituting the heat exchanger 46 is supported by the canopy 36 via the water level indicator 40, and the attachment rigidity can be further increased. In addition to this, due to the improvement effect of the attachment rigidity due to the bracket 48, and the multiplier effect thereof, the attachment rigidity of the heat exchanger 46, the water level indicator 40, and the densitometer 42 with respect to the canopy 36 can be further improved, and for example the vibration resistance performance can be significantly improved.

Moreover, when inspecting and maintaining only the water level indicator 40 fitted to the reducing agent container 24, the bolts 44 fastening the base 40A to the canopy 36 are removed, and the detecting portion 40B is pulled out upwards so as to not interfere with the container body 24A. At this time, accompanying the pulling out in the upward direction of the water level indicator 40, the pin 56A of the cap 56 which is press-fitted onto the tip end portion of the detecting portion 40B comes out from the insertion hole 54A of the bracket 54. Then, once the inspection and maintenance of the water level indicator 40 has been completed, the pin 56A of the cap 56 is inserted into the insertion hole 54A of the bracket 54, and the base 40A of the water level indicator 40 is fastened to the canopy 36 with the bolts 44. At this time, since the pin 56A is formed in a taper shape with the diameter reducing towards the tip end, insertion into the insertion hole 54A is easy, and a gap between this and the insertion hole 54A becomes small so that either looseness or play can be prevented.

The present invention is not limited to an exhaust gas purification apparatus which uses urea aqueous solution as the liquid reducing agent, and can also be applied to one which uses as the liquid reducing agent, gasoline, diesel oil, alcohol, and the like in which hydrocarbon is the principal component.

What is claimed is:

1. A structure of a reducing agent container which stores a liquid reducing agent used in an exhaust gas purification apparatus for reducing and purifying nitrogen oxide in an exhaust gas, wherein a canopy is removably secured to a container body of the reducing agent container to block off an opening arranged in an upper face of the container body, the canopy being respectively fitted with: a base of a water level indicator for detecting a remaining amount of liquid reducing agent; a base of a densitometer for detecting a density of a liquid reducing agent; and a heat exchanger which surrounds detection portions suspended from the bases of the water level indicator and the densitometer, and through which is circulated a heating medium of which a heat source essentially consisting of an engine as, to perform heat exchange with the liquid reducing agent, and wherein the canopy is respectively formed with: a supply port and a return port for the liquid reducing agent so that the water level indicator, the densitometer, the heat exchanger, and the supply port and the return port for the liquid reducing agent are formed integrally with the canopy wherein the base of the water level indicator is removably secured to the canopy, and on a tip end of the water level indicator extends in an axial direction thereof, and a bracket having an insertion hole for removable insertion of the pin, is fitted at a position where the heat exchanger extends along a bottom face of the container body.

2. A structure of a reducing agent container according to claim 1, wherein the pin is formed with a taper shape with diameter reducing towards a tip end thereof.

* * * * *